US011645654B2

(12) United States Patent
Ferenczi et al.

(10) Patent No.: US 11,645,654 B2
(45) Date of Patent: May 9, 2023

(54) BIOMETRIC-BASED IDENTITY VERIFICATION USING ZERO-KNOWLEDGE PROOFS

(71) Applicant: American Express Travel Related Services Company, Inc., New York, NY (US)

(72) Inventors: Andras Ferenczi, Peoria, AZ (US); Alaric Eby, Scottsdale, AZ (US); Subrahmanyam Venkata Vishnuvajhala, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 109 days.

(21) Appl. No.: 17/148,718

(22) Filed: Jan. 14, 2021

(65) Prior Publication Data

US 2022/0222678 A1  Jul. 14, 2022

(51) Int. Cl.
  *G06Q 20/40*  (2012.01)
  *G06Q 20/38*  (2012.01)
(52) U.S. Cl.
  CPC ... *G06Q 20/40145* (2013.01); *G06Q 20/3829* (2013.01)
(58) Field of Classification Search
  CPC .............. G06Q 20/40145; G06Q 20/3829
  See application file for complete search history.

(56) References Cited

U.S. PATENT DOCUMENTS

| 8,527,758 | B2 * | 9/2013 | Mansour | H04L 63/0861 |
| | | | | 713/168 |
| 10,868,672 | B1 * | 12/2020 | Farrugia | H04L 9/0861 |
| 2011/0060903 | A1 | 3/2011 | Yoshida et al. | |
| 2012/0210406 | A1 * | 8/2012 | Camenisch | H04L 9/302 |
| | | | | 726/5 |
| 2018/0211022 | A1 * | 7/2018 | Wagner | G06F 21/34 |
| 2018/0268398 | A1 * | 9/2018 | Park | G06Q 20/02 |
| 2018/0268412 | A1 * | 9/2018 | Phadke | G06Q 20/40145 |
| 2018/0268413 | A1 * | 9/2018 | Phadke | G07C 9/257 |

(Continued)

FOREIGN PATENT DOCUMENTS

| EP | 2343678 A1 | 7/2011 |
| KR | 1020170039642 | 4/2017 |
| WO | 2019171163 A1 | 9/2019 |

OTHER PUBLICATIONS

PCT International Search Report in co-pending, related PCT Application No. PCT/US2022/070071, dated May 4, 2022.

(Continued)

*Primary Examiner* — Olabode Akintola
*Assistant Examiner* — Paul R Kloberg
(74) *Attorney, Agent, or Firm* — Thomas | Horstemeyer, LLP

(57) ABSTRACT

Disclosed are various embodiments for verifying a consumer's identity during card-not-present (CNP) transactions using biometric data (e.g., fingerprint, retina scan, iris scan, handprint, voice sample, face scan, etc.) of the consumer obtained using a biometric security device. A zero-knowledge proof algorithm is used to verify the identity of a user initiating a transaction without disclosing personal information (e.g., biometric data) of the user to the issuer, merchant, recipient and/or other party, thereby preserving the privacy of the user.

20 Claims, 6 Drawing Sheets

(56) References Cited

U.S. PATENT DOCUMENTS

| | | | |
|---|---|---|---|
| 2019/0043281 A1* | 2/2019 | Aman | G07C 9/257 |
| 2020/0067907 A1* | 2/2020 | Avetisov | H04L 9/3239 |
| 2020/0126075 A1* | 4/2020 | Fisch | G06F 21/6245 |
| 2020/0233943 A1* | 7/2020 | Adjaz | H04L 63/0861 |
| 2021/0049588 A1* | 2/2021 | Kamal | G06Q 20/3827 |
| 2021/0103648 A1* | 4/2021 | Wagner | G06F 21/34 |
| 2021/0224814 A1* | 7/2021 | Phadke | G06K 7/10366 |
| 2021/0287209 A1* | 9/2021 | Nelluri | G06Q 20/3678 |

OTHER PUBLICATIONS

Website entitled: "Online Shopping Secured with Visa", https://usa.visa.com/pay-with-visa/featured-technologies/verified-by-visa.html downloaded Jan. 5, 2021 9:51:50 AM.

* cited by examiner

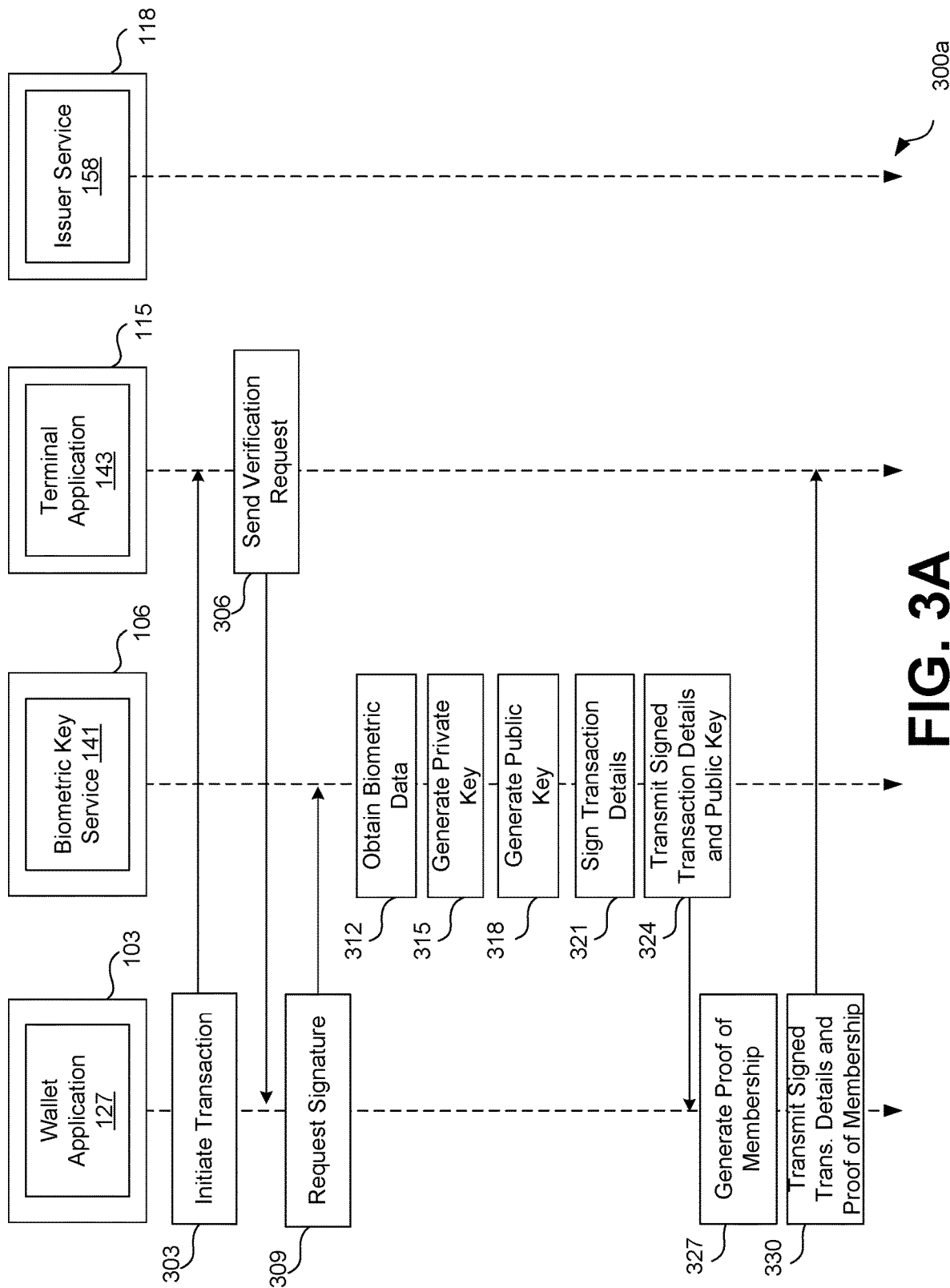

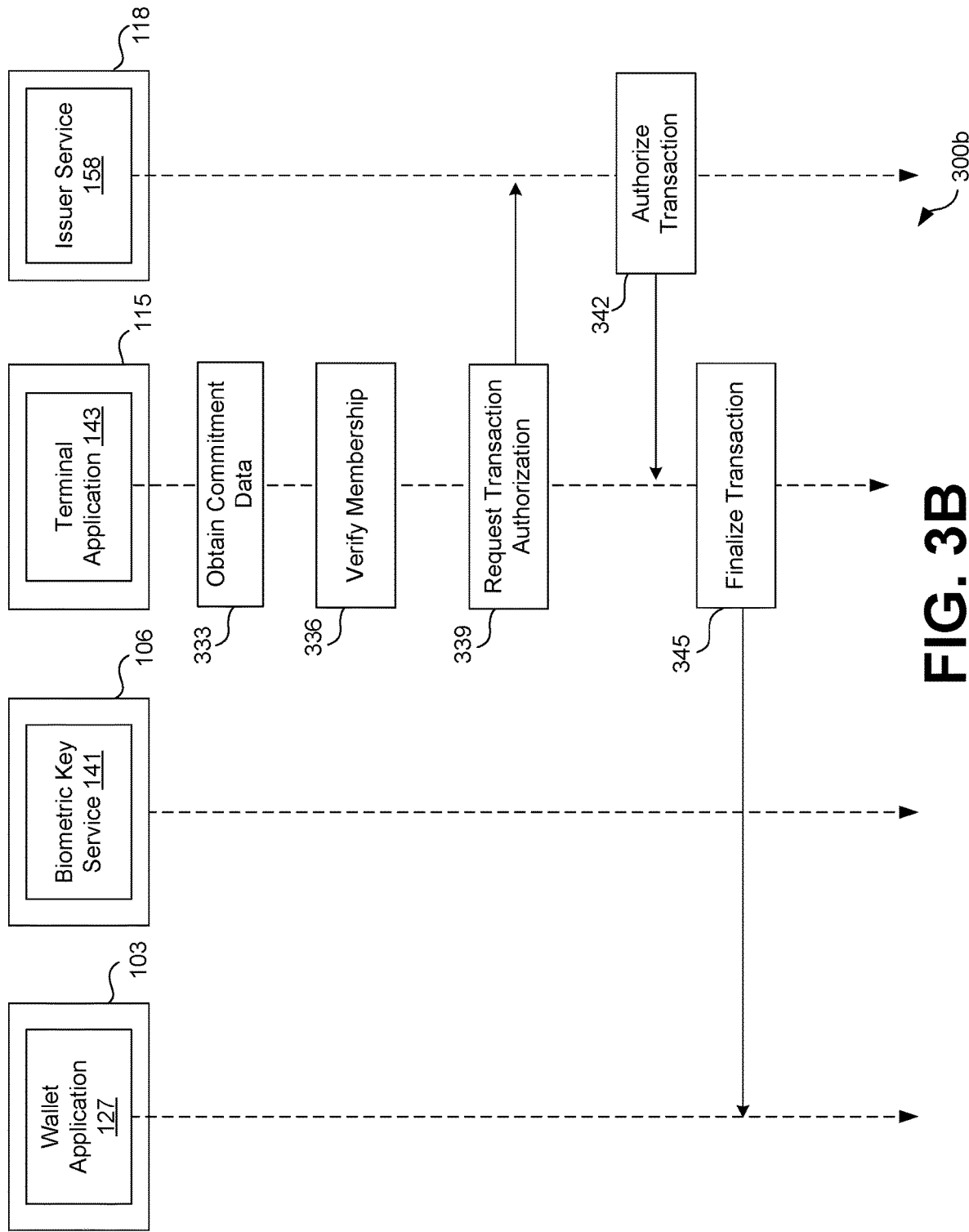

BIOMETRIC-BASED IDENTITY VERIFICATION USING ZERO-KNOWLEDGE PROOFS

BACKGROUND

When a consumer engages in a transaction with a provider of goods or services, the consumer can use a payment instrument (e.g., a transaction card such as a credit or debit card) that is associated with a payment issuing service (e.g., issuer) to pay for the goods or services associated with the transaction. In this case, the consumer has entered into an agreement with the issuer such that the issuer agrees to pay a merchant on behalf of the user. Typically, in these situations, the merchant utilizes a transaction terminal or point-of-sale device that determines whether a consumer's payment instrument is authorized to enter into the transaction, and the issuer pays the provider for the outstanding balance associated with the transaction.

However, in Card-Not-Present (CNP) transactions where the payment instrument and the consumer are not physically present at the time of the transaction (e.g., online transaction), the identity of the consumer cannot be verified. During these types of transactions, the provider is typically liable for any fraudulent transactions associated with the use of the payment instrument where the identity of the consumer cannot be verified. Improving the security of payment transactions with mobile devices or transaction cards while preserving the privacy of the consumer is a constant need.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 illustrates an example of the functionality associated with a user registering with an identity verification program according to various embodiments of the present disclosure.

FIGS. 3A and 3B are sequence diagrams illustrating an example of functionality implemented as a portion of the network environment of FIG. 1 according to various embodiments of the present disclosure. In particular, FIGS. 3A-3B depict an example of the functionality associated with the verification of the identity of a user in response to a user initiating a transaction according to various embodiments of the present disclosure.

FIG. 4 depicts an example of the functionality a terminal application with respect to verifying the identity of a user according to various embodiments.

FIG. 5 depicts an example of the functionality of a biometric key service with respect to generating a private key and a public key used for registering a user according to various embodiments.

FIG. 6 depicts an example of the functionality of the biometric key service with respect to generating the private key and signing transaction details associated with a transaction with the private key for verification according to various embodiments

DETAILED DESCRIPTION

Figure 1:
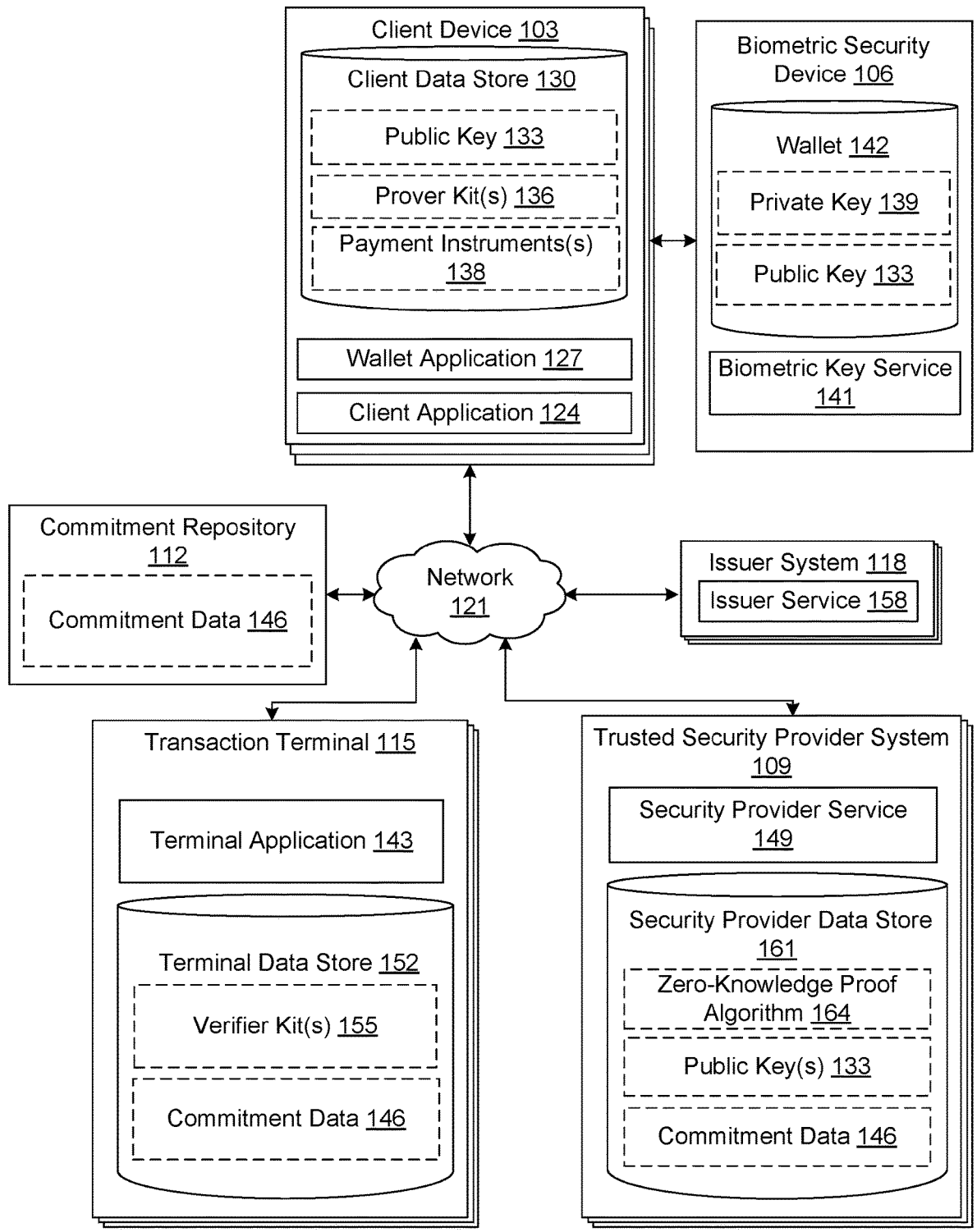
FIG. 1 is a drawing of a network environment according to various embodiments of the present disclosure.

Disclosed are various approaches for verifying a consumer's identity during card-not-present (CNP) transactions using biometric data (e.g., fingerprint, retina scan, iris scan, handprint, voice sample, face scan, etc.). According to various embodiments, a zero-knowledge proof algorithm is used to verify the identity of a user initiating a transaction without disclosing personal information of the user to the issuer, merchant, recipient and/or other party, thereby preserving the privacy of the user. In addition, by being able to verify the identity of the user during the transactions (e.g., CNP transactions, etc.), the likelihood of a fraudulent transaction is reduced.

According to various embodiments, a user can register with a trusted security provider (e.g., issuer, bank, trusted government entity, etc.) to be a member of an identity verification program by using a biometric security device configured to collect biometric data. The biometric security device can create a private key based on a hash that can be generated using the collected biometric data. A public key derived from the private key can be provided to the trusted security provider, while the private key and, thus potentially identifying information of the user, remains on the biometric security device. Upon verifying the identity of the user associated with the public key, the trusted security provider can register the user and corresponding biometric security device with the identity verification program by creating an accumulator commitment using the public key.

When a registered user, via interactions with a client device, initiates an online transaction with a transaction terminal (e.g., a merchant), the transaction terminal can request a proof of membership from the registered user prior to proceeding with the transaction. In this situation, the user can submit biometric data to the biometric security device which can be used to generate the private key. In various examples, the private key can be a hash of the collected biometric data. The biometric security device can further sign transaction details associated with the transaction using the private key. Upon receiving the signed transaction details and a corresponding public key from the biometric security device, the client device generates the proof of membership according to a zero-proof knowledge algorithm.

The client device then transmits the proof of membership, the public key, and the signed transaction details to the transaction terminal. Using the proof of membership, the signed transaction details, and commitment data associated with the registered members, the transaction terminal can verify the membership of the user, thereby verifying the identity of the user associated with the transaction request. In some embodiments, the transaction terminal can send the signed transaction details and proof of membership to an issuer system, and the issuer system can verify the identity of the user associated with the transaction request. Traditionally, verification of an identity of a user for online transactions does not occur or requires the user to be redirected to a network page associated with the issuer system or some other third-party trusted entity. By verifying the identity of the user by the transaction terminal and/or the issuer according to the various embodiments of the present disclosure, the user can be securely verified without redirecting the user to a network page associated with the issuer system and/or another third-party trusted entity.

It should be noted that the type of biometric data collected and used to register a user and verify the user during a transaction can vary among members in the identity verification program. For example, one user's membership can be based on a collection of fingerprint data, while another user's membership can be based on a retina scan. Therefore, membership of the identity verification program is not limited to a particular type of biometric data.

With reference to FIG. 1, shown is a network environment 100 according to various embodiments. The network environment 100 includes one or more client devices 103, a biometric security device 106, a trusted security provider system 109, a commitment repository 112, one or more transaction terminals 115, and an issuer system 118, which are in data communication with each other via a network 121. The network 121 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 121 can also include a combination of two or more networks 121. Examples of networks 121 can include the Internet, intranets, extranets, virtual private networks (VPNs), and similar networks.

A client device 103 can be a computer system or device that includes a processor, a memory, a network interface, and various other hardware. Such a computer system can be embodied in the form of a personal computer (e.g., a desktop computer, a laptop computer, or similar device), a mobile computing device (e.g., personal digital assistants, cellular telephones, smartphones, web pads, tablet computer systems, and similar devices), or other devices with like capability. The client device 103 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 103 or can be connected to the client device 103 through a wired or wireless connection.

The client device 103 can be configured to execute various applications such as a client application 124, a wallet application 127, or other applications. The client application 124 can be executed in a client device 103 to access network content served up by the trusted security provider system 109, the transaction terminal 115, the issuer system 118, or other devices or datastores, thereby rendering a user interface on a display. To this end, the client application 124 can include a browser, a dedicated application, or other executable, and the user interface can include a web page, an application screen, or other user mechanism for obtaining user input.

The wallet application 127 can be executed to communicate with the transaction terminal 115 and other systems to initiate payments with a transaction terminal 115. In addition, the wallet application 127 can be executed to communicate with the biometric security device 106 with regard to obtaining signed transaction details associated with payments initiated with the transaction terminal 115. The client device 103 can be configured to execute applications beyond the client application 124 and the wallet application 127, such as email applications, social networking applications, word processors, spreadsheets, or other applications.

The client data store 130 represents mass storage or memory in which the client device 103 can store information. The client data store 130 can include a public key 133, one or more prover kits 136, and other data. The public key 133 can comprise a public key 133 of a biometric-based key pair comprising a private key 139 and the public key 133. According to various embodiments, the biometric-based key pair can be generated by the biometric key service 141 of the biometric security device 106 in response to obtaining biometric data associated with a user. In particular, the private key 139 can be a hash generated using the biometric data obtained by the biometric security device 106. The public key 133 can be derived from the private key 139 using various approaches, such as, for example, a key derivation function.

Upon initiating a transaction, the wallet application 127 can send transaction details (e.g. transaction amount, merchant identifier, and/or other payload data) to the biometric key service 141 requesting signature of the transaction details using the private key 139. In response, the biometric key service 141 can provide the signed transaction details and corresponding public key 133 to the wallet application 127. The public key 133 can be used in generating a proof of membership in a user verification program according to the prover kit 136 associated with a zero-knowledge proof algorithm. The proof of membership can be generated by the client device 103 and provided to the terminal application 143 to verify the identity of the user initiating the transaction.

A prover kit 136 can be a script, application, or process that can be executed by the client device 103 to generate a proof of membership that can be used by the transaction terminal 115 to verify the identity of the user initiating the transaction. The proof of membership can be a zero-knowledge proof that is based on a zero-knowledge proof algorithm.

A zero-knowledge proof is a method by which a proving party (e.g., the client device 103) can prove to a verifying party (e.g., the transaction terminal 115) that they possess certain information (e.g., user identification) while only providing to the verifying party the fact that they possess the information (e.g., no transfer of biometric data). As such, the proving party is in possession of information that is not provided to the verifying party, and the verifying party is able to prove that the information is what the proving party asserts the information to be through a performance of the steps of the zero-knowledge proof. An interactive zero-knowledge proof requires interactions between the two parties, so that the verifying party can validate the proof. In contrast, a non-interactive zero-knowledge proof is a method that allows the verifier to validate the proof without any type of interaction from the proving party.

The generated proof of membership can be utilized by embodiments of the present disclosure to allow a transaction terminal 115 to validate or otherwise verify the identity of the user, without the client device 103 or the biometric security device 106 exposing sensitive data, such as the private key corresponding to a public key 133 associated with the obtained biometric data. Indeed, according to various embodiments, the proof of membership, along with the public key 133 and the transaction data signed with the corresponding private can used to verify the identity of the user initiating a transaction and confirm that the user is a registered member of the identity verification program.

The payment instruments 138 can correspond to data associated with transaction accounts provided by the issuer of the issuer system 118. For example, the payment instruments 138 can comprise data describing credit cards, debit cards, virtual cards, charge cards, and/or other mechanisms for effecting a payment with respect to a transaction account provided by the issuer of the issuer system 118 and associated with the user of the client device 103. For example, for a credit card or a charge card, the payment instrument 138 can store a card number, a cardholder name, an expiration date, a verification code, a billing address, and/or other information needed to consummate a payment.

The biometric security device 106 is a device that can be configured to collect biometric data from a user that represents a unique physical characteristic of the user (e.g., fingerprint, retina scan, iris scan, facial scan, handprint, voice sample data, etc.). For example, the biometric security device 106 can comprise an input sensor module (e.g., fingerprint scanner, voice recorder, iris scanner, retina scanner, camera, etc.) for obtaining biometric data associated with the user. In addition to collecting the biometric data associated with a given user, the biometric security device 106 can further generate a biometric-based key-pair(s) comprising the public key 133 and the private key 139, where the private key 139 is a hash based on the obtained biometric data. For example, the biometric security device 106 can comprise a hardware security module that includes one or more secure cryptoprocessors or a processor that executes software that performs cryptographic operations to generate the biometric-based key pair(s).

Various applications or other functionality can be executed by the biometric security device 106 according to various embodiments. The components executed on the biometric security device 106 can include a biometric key service 141 and other applications, services, processes, systems, engines, or functionality not discussed in detail herein.

The biometric key service 141 can be executed to generate the biometric-based key pair using the biometric data obtained from the user. In particular, the private key 139 can be derived from a hash that is based on the inputted biometric data. For example, the hash corresponding to the private key 139 could be computed using a cryptographic hash function that accepts the biometric data as an argument. In another example, the hash corresponding to the private key 139 could be implemented as a tuple that includes one or more pieces of information, such as the biometric data associated with the user. The biometric key service 141 can be further executed to derive a public key 133 from the private key 139. For example, the public key 133 can be derived from the private key 139 using various approaches, such as, for example, a key derivation function.

The biometric key service 141 can store the private key 139 and the public key 133 in the wallet 142 of the biometric security device 106. In various embodiments, the private key 139 remains in the wallet 142 and is never transmitted to other devices or systems, including the client device 103, the trusted security provider system 109, the transaction terminal 115, and the issuer system 118, thereby preserving the privacy associated with the user and the obtained biometric data.

During the registration process of the user, the biometric key service 141 can transmit the public key 133 to the security provider service 149 of the trusted security provider system 109. As such, the security provider service 149 can use the received public key 133 to generate a registration commitment used to update the commitment data 146, thereby signifying membership of the user with the identity verification program. When the client device 103 initiates a transaction with the terminal application 143, the transaction terminal 115 can transmit transaction details to the client device 103, which in turn transmits the transaction details to the to the biometric security device 106. The biometric key service 141 of the biometric security device 106 can sign the transaction details using the private key 139 created based on the collected biometrics. In various examples, the biometric security device 106 generates a new private key 139 using newly obtained biometric data from the user.

In the example of FIG. 1, the biometric security device 106 can be connected to the client device 103 via a wired or wireless connection. In various embodiments, the biometric security device 106 can comprise a portable device that can be connected to other systems, such as, for example, the trusted security provider system 109. For example, during the registration process, the biometric security device 106 can be connected to the trusted security provider system 109 in a wired or wireless connection. In this example, the trusted security provider system 109 can obtain the public key 133 generated by the biometric security device 106 and used to register the user as a member of the identity verification program.

The wired or wireless protocol associated the above described connections can correspond to a controller area network (CAN) bus protocol, an Ethernet physical layer protocol (e.g., those using 10BASE-T, 100BASE-T, 1000BASE-T, etc.), an IEEE 1394 interface, (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection. It should be noted that in some embodiments, the biometric security device 106 can be integrated within the client device 103.

The trusted security provider system 109 is an entity that has a known reputation with the issuer of the issuer system 118 that meets a given threshold to be considered trusted. In some examples, the trusted security provider system 109 can be integrated with the issuer system 118. In other examples, the trusted security provider system 109 can be associated with another type of trusted entity, such as, for example, a trusted government entity (e.g., Department of Motor Vehicles, the United States Postal Service, etc.) or other type of trusted entity. The transaction terminal 115 can be associated with a merchant (e.g., a seller, a supplier, etc.) that engages in a transaction with a client device 103 with respect to the exchange of goods and services with a payment of funds. The issuer system 118 can be associated with an issuer that can provide to the merchant a payment on behalf of the consumer. As such, the customer can have an established relationship with an issuer where the issuer has provided the customer with a transaction account that the consumer can present to the merchant in the form a payment instrument 138 for payment of the goods and/or services associated with the transaction.

The trusted security provider system 109 can be representative of a plurality of computing devices that can be coupled to the network 121. The trusted security provider system 109 can include a corresponding computer system or computing device with a processor and a memory. Such a computer system can be embodied in the form of a personal computer (e.g., a desktop computer, a laptop computer, or similar device), a cluster of computing devices, servers, virtualized computing systems, or other devices with like capability.

Various applications or other functionality can be executed by the trusted security provider system 109 according to various embodiments. The components executed on the trusted security provider system 109 can include a security provider service 149 and other applications, services, processes, systems, engines, or functionality not discussed in detail herein.

The security provider service 149 can register users in the identity verification program in response to obtaining a public key 133 from a biometric security device 106 and authenticating the user associated with the public key 133. For example, during the registration process the security provider service 149 can request a public key 133 from the biometric security device 106. The public key 133 can be derived from the private key 139, which can be a hash generated using biometric data associated with the registering user.

The authentication of the user associated with the public key 133 corresponds to verifying the identity of the user during the registration process. In some situations, the user can visit a physical location associated with the trusted security provider and submit valid identification (e.g., a passport, a state-issued identification card, a driver's license, or a military-issued identification card etc.) that proves the identity of the user. Upon verifying the user through a review and confirmation of the valid identification, a security provider can submit to the security provider service 149 via interactions with a user interface associated with the security provider service 149 that the identification of the user is verified. In other examples, the client device 103 can submit a zero-knowledge proof to the security provider service 149 which can be used to validate the identity of the user, thereby allowing registration to proceed.

Upon receiving the public key 133 from the biometric security device 106 and authenticating the user, the security provider service 149 can generate a registration commitment associated with a cryptographic accumulator. The registration commitment can be generated based on the public key 133 and, in some instances, a device identifier associated with the biometric security device 106. Upon generating the registration commitment, the security provider service 149 can publish the commitment to the commitment repository 112.

The security provider service 149 can further generate the prover kit(s) 136 and verifier kit(s) 155 that can be used by the client device 103 and transaction terminal 115 to verify the identity of the user associated with an initiated transaction based on a membership represented in the commitment data 146. The prover kit(s) 136 and verifier kit(s) 155 can be generated based at least in part on a zero-knowledge proof algorithm that verifies membership of the user, and therefore, the identity of the user, via the commitment data 146 that can be stored in the commitment repository 112. Once generated, the security provider service 149 can transmit the prover kit 136 to the corresponding client device and transmit the verifier kit 155 to the transaction terminal 115 and/or issuer system 118.

Also, various data can be stored in a security provider data store 161 that can be accessible to the trusted security provider system 109. The security provider data store 161 can be representative of a plurality of security provider data stores 161, which can include relational databases, object-oriented databases, hierarchical databases, hash tables or similar key-value data stores, as well as other data storage applications or data structures. The data stored in the security provider data store 161 can be associated with the operation of the various applications or functional entities described below. This data can include a zero-knowledge proof algorithm 164, public keys 133 associated with registered users, commitment data 146, and potentially other data.

The zero-knowledge proof algorithm 164 represents a zero-knowledge proof algorithm specified by the security provider for interactions between the client device 103 and transaction terminal 115. The zero-knowledge proof algorithm 164 can include a reference to multiple algorithms that are approved for use by the transaction terminal 115 and client device 103. The zero-knowledge proof algorithm 164 can be used to generate the prover kits 136 and the verifier kits 155 that are accepted for use by the client device 103 and transaction terminal 115 to perform user identity verification. For example, the prover kits 136 are generated and transmitted to the corresponding client device 103 following registration of the user. Likewise, the verifier kits 155 can be generated and transmitted to the transaction terminal 115. In some examples, the verifier kits 155 comprise generic verifier kits that can be used to verify the identity of the user using the proof of membership result of the prover kit 136 and the commitment data 146 stored in the commitment repository 112.

The commitment data 146 represents a list of registration commitments corresponding to users who have registered with an identity verification program. The registration commitments are generated by the security provider service 149 of the trusted security provider system 109 upon receiving a registration request from a user associated with the biometric security device 106. In particular, the registration commitment can be generated using the public key 133 associated with the user. The public key 133 can be derived from the private key 139 comprising a hash that can be created by the biometric key service 141 using the obtained biometric data associated with the registering user. When a user is registering with the identity verification program, the security provider service 149 generates the membership commitment using the public key 133 provided by the biometric security device 106. An identification of the public key 133 in the commitment data 146 can be used to verify the identity of a user initiating a transaction with the transaction terminal 115 by verifying membership.

The transaction terminal 115 can be representative of a plurality of computing devices that can be coupled to the network 121. The transaction terminal 115 can include a corresponding computer system or computing device with a processor and a memory. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), a payment terminal, a point of sale (PoS) system, or other devices with like capability.

Various applications or other functionality can be executed by the transaction terminal 115 according to various embodiments. The components executed on a transaction terminal 115 can include a terminal application 143 and other applications, services, processes, systems, engines, or functionality not discussed in detail herein.

The terminal application 143 can communicate with an issuer system 118 to get provisioned to conduct transactions with payment instruments associated with accounts of users or entities with an issuer. The terminal application 153 can also communicate with client devices 103 to conduct transactions with payment instruments 138 that are presented to the terminal application 143 during the initiation of a transaction. The terminal application 143 can determine whether a particular transaction is approved or denied based upon information presented by a client device 103 and potentially other information, such as a transaction authorization obtained from the issuer system 118, or information obtained from a distributed ledger. In addition, the terminal application 143 can verify the identity of the user associated with the client device 103 initiating the transaction by determining membership of the user prior to obtaining a transaction authorization from the issuer system 118.

The terminal application 143 can also communicate with the commitment repository 112 to access the commitment data 146 used to verify the identity of the user. The commitment repository 112 can correspond to a repository of commitment data 146 associated with registered users of an identity verification program. In some examples the commitment repository 112 comprises a centralized datastore. In other embodiments, the commitment repository 112 comprises decentralized data store, such as a blockchain or another distributed ledger. In this example, the commitment repository 112 can represent a synchronized, eventually consistent, data store spread across multiple nodes, some or all of which can be in different geographic or network locations. Records of transactions involving the commitment repository 112 can be shared or replicated using a peer-to-peer network connecting the individual nodes that can write to the commitment repository 112. Once information is written in the commitment repository 112, it can be replicated across the peer-to-peer network until the record is eventually recorded with all of the nodes. Various consensus methods can be used to ensure that data is written reliably to the commitment repository 112. Examples of a distributed ledger can include blockchains, distributed hash tables (DHTs), and similar data structures.

Also, various data is stored in a terminal data store 152 that is accessible to the transaction terminal 115. The terminal data store 152 can be representative of a plurality of terminal data stores 152, which can include relational databases, object-oriented databases, hierarchical databases, hash tables or similar key-value data stores, as well as other data storage applications or data structures. The data stored in the terminal data store 152 can be associated with the operation of the various applications or functional entities described below. This data can include one or more verifier kits 155, commitment data 146, and potentially other data.

The verifier kits 155 can represent a script, application, or process that can be executed by the terminal application 143 to verify the proof of membership that is a result of the prover kit 136 executed on the client device 103. The verifier kits 155 can be provided to the transaction terminal 115 by the trusted security provider system 109 in response to the registration of the user with the identity verification program. According to various embodiments, the verifier kits 155 can be configured to work in conjunction with the prover kits 136 executed on the client device 103, so that the terminal application 143 can verify the proof of membership provided by a client device 103 (e.g., the result of the prover kits 136) to prove or otherwise validate the identity of the user initiating the transaction with the transaction terminal 115.

The issuer system 118 can be representative of a plurality of computing devices that can be coupled to the network 121. The issuer system 118 can include a corresponding computer system or computing device with a processor and a memory. Such a computer system can be embodied in the form of a personal computer (e.g., a desktop computer, a laptop computer, or similar device), a cluster of computing devices, servers, virtualized computing systems, or other devices with like capability.

Various applications or other functionality can be executed by the issuer system 118 according to various embodiments. The components executed on an issuer system 118 can include an issuer service 158 and other applications, services, processes, systems, engines, or functionality not discussed in detail herein.

The issuer service 158 can be executed to provision transaction terminals 115 to accept payments using payment instruments 138 issued by the issuer service 158. The issuer service 158 can receive transaction details for a given transaction from the terminal application 143. Using the transaction details included in the request, the issuer service 158 can confirm that funds or credit is available for a given payment instrument 138, such that the payment transaction is authorized to proceed or not authorized to proceed. Further, the issuer service 158 can perform its own risk analysis to determine whether to authorize or deny the payment transaction. Upon authorization of the transaction, the issuer service 158 can generate a transaction confirmation identifier and send the transaction confirmation identifier to the terminal application 143.

It should be noted that although the verification of the identity of the user is discussed as being performed by the terminal application 143, in various examples, the issuer service 158 can be executed to verify the identity of the user instead of and/or in addition to the verification performed by the transaction application 143. In these examples, the issuer system 118 can have access to the verifier kit 155 and the commitment data 146 that can be used to verify the identity of the user. Upon receiving a request to initiate a transaction and receiving signed transaction details, proof of membership, and public key 133 from the client device 103, the terminal application 143 can generate an authorization request that includes the signed transaction details and proof of membership. As such, the issuer service 158 can verify the user using the proof of membership, the signed transaction details, the public key 133, the verifier kit 155, and the commitment data 146, and can authorize the transaction in response to verifying the user.

Figure 2:
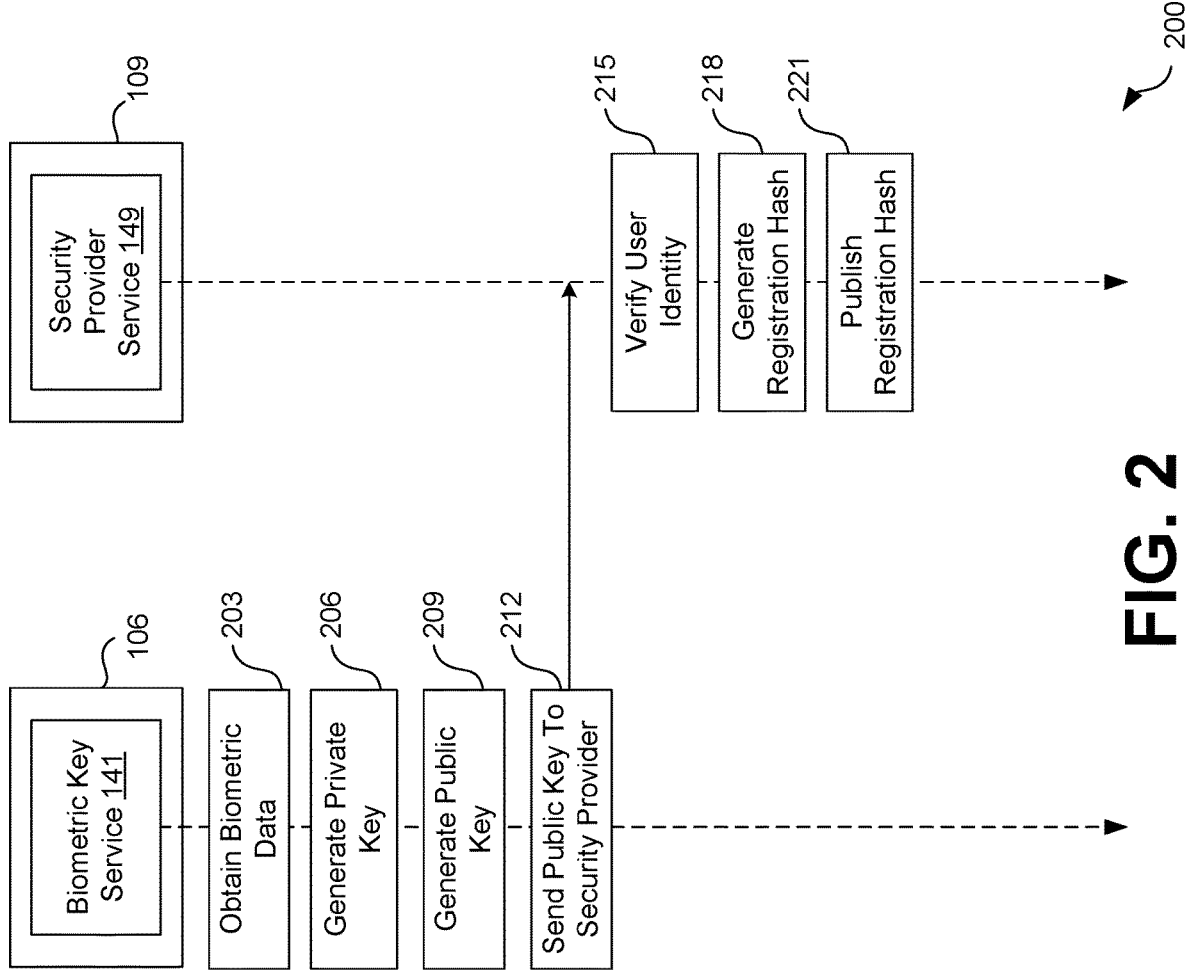
FIG. 2 is a sequence diagram illustrating an example of functionality implemented as a portion of the network environment of FIG. 1 according to various embodiments of the present disclosure. In particular.

FIG. 2 illustrates a sequence diagram 200 that provides an example of the operation of the components of the network environment 100. It is understood that the sequence diagram 200 of FIG. 2 provides merely an example of the many different types of functional arrangements that can be employed to implement the operation of the depicted portion of the network environment 100. As an alternative, the sequence diagram 200 of FIG. 2 can be viewed as depicting an example of elements of a method implemented within the network environment 100. In particular, the sequence diagram 200 of FIG. 2 depicts the functionality associated with a user registering with an identity verification program according to various embodiments of the present disclosure.

To begin, at block 203, the biometric key service 141 of the biometric security device 106 can obtain biometric data from a user requesting registration with an identity verification program. According to various embodiments, the biometric security device 106 can comprise an input sensor module (e.g., fingerprint scanner, voice recorder, iris scanner, retina scanner, camera, etc.) for obtaining biometric data associated with the user. A user can permit the biometric security device 106 to obtain the unique biometric data associated with the user via the input sensor module. Accordingly, the input sensor module collects the corresponding biometric data and transmits the collected data to the biometric key service 141.

At block 206, the biometric key service 141 can generate a private key 139. According to various embodiments, the private key 139 corresponds to a hash that can be created using the collected biometric data. For example, the hash corresponding to the private key 139 could be computed using a cryptographic hash function that accepts the biometric data as an argument. In another example, the hash corresponding to the private key 139 could be implemented as a tuple that includes one or more pieces of information, such as the biometric data associated with the user.

At block 209, the biometric key service 141 can derive a public key 133 from the private key 139. In particular, the public key 133 can be used to register the user with the identity verification program. Since the public key 133 can be derived from a private key 139 that is based on the biometrics associated with the registering user, the public key 133 can be considered associated with the biometrics of the registering user. In various examples, public key 133 can be derived from the private key 139 using various approaches, such as, for example, a key derivation function.

At block 212, the biometric key service 141 can transmit the public key 133 to the security provider service 149. The biometric security device 106 can be communicatively coupled to the trusted security provider system 109 via a wired or wireless connection. As such, the public key 133 can be transmitted to the security provider service 149 through the established electronic communication channel formed through the wired or wireless connection. In some examples, the biometric key service 141 can further transmit additional information (e.g., device identifier, device manufacture, etc.) associated with the biometric security device 106 to the security provider service 149.

At block 215, the security provider service 149 can verify the identity of the user associated with the received public key 133. In some situations, the user can visit a physical location associated with the trusted security provider and submit valid identification (e.g., a passport, a state-issued identification card, a driver's license, or a military-issued identification card, etc.) that proves the identity of the user. Upon verifying the user through a review of the valid identification, a security provider can submit to the security provider service 149 via interactions with a user interface associated with the security provider service 149 that the identification of the user is verified. In other examples, the client device 103 can submit a zero-knowledge proof to the security provider service 149 which can be used to validate the identity of the user, thereby allowing registration to proceed.

At block 218, the security provider service 149 can generate a registration hash based on the public key 133. For example, the registration hash could be computed using a cryptographic hash function that accepts the public key 133, a device identifier, and/or other information as arguments. In another example, the registration hash could be implemented as a tuple that includes one or more pieces of information, including the public key 133. In various examples, the registration hash can comprise a membership commitment associated with a cryptographic accumulator.

At block 221, the security provider service 149 can publish the registration hash for inclusion in the commitment data 146 stored in the commitment repository 112. The commitment repository 112 can correspond to a repository of commitment data 146 associated with registered users of an identity verification program. In some examples the commitment repository 112 comprises a centralized datastore. In other embodiments, the commitment repository 112 comprises decentralized data store, such as a blockchain or other distributed ledger. In this example, the commitment repository 112 can represent a synchronized, eventually consistent, data store spread across multiple nodes, some or all of which can be in different geographic or network locations. Various consensus methods can be used to ensure that data is written reliably to the commitment repository 112.

Referring next to FIGS. 3A-3B, shown is a sequence diagram 300 (e.g., 300a, 300b) that provides an example of the operation of the components of the network environment 100. It is understood that the sequence diagram 300 of FIGS. 3A-3B provides merely an example of the many different types of functional arrangements that can be employed to implement the operation of the depicted portion of the network environment 100. As an alternative, the sequence diagram 300 of FIGS. 3A-3B can be viewed as depicting an example of elements of a method implemented within the network environment 100. In particular, sequence diagram 300 of FIGS. 3A-3B depicts the functionality associated with the verification of the identity of a user in response to a user initiating a transaction according to various embodiments of the present disclosure.

At block 303, the wallet application 127 can initiate a transaction with a transaction terminal 115. For example, a user can interact with the wallet application 127 to request a transaction with the transaction terminal 115 with respect to the purchase of goods or services using a payment instrument 138 that is provided by an issuer associated with the issuer system 118. Accordingly, the wallet application 127 can generate a transaction request and transmit the transaction request to the terminal application 143 executing on the transaction terminal 115.

At block 306, the terminal application 143 can transmit a verification request to the wallet application 127. According to various embodiments, the verification request includes transaction details associated with the transaction. The transaction details can include a transaction amount, a list of goods or services associated with the transaction, merchant name, merchant address, and/or other type of transaction payload data. In one example implementation, the verification request can include, without limitation, a request for the proof of membership and for the transaction details to be signed with the private key 139 generated based on biometric data associated with the requesting user.

At block 309, the wallet application 127 can send the transactions details to the biometric key service 141 of the biometric security device 106 for signature. According to various embodiments, the client device 103 can be communicatively coupled to the biometric security device 106 via a wired or wireless connection. The transaction details can be transmitted via the electronic communication channel formed via the wired or wireless connection.

At block 312, the biometric key service 141 can obtain the biometric data associated with the user initiating the transaction. According to various embodiments, the biometric security device 106 can comprise an input sensor module (e.g., fingerprint scanner, voice recorder, iris scanner, retina scanner, camera, etc.) for obtaining biometric data associated with the user. A user can permit the biometric security device 106 to obtain the unique biometric data associated with the user via the input sensor module. Accordingly, the input sensor module can collect the corresponding biometric data and transmit the collected data to the biometric key service 141.

At block 315, the biometric key service 141 can generate a private key 139. According to various embodiments, the private key 139 corresponds to a hash that can be created using the collected biometric data. For example, the hash corresponding to the private key 139 could be computed using a cryptographic hash function that accepts the biometric data as an argument. In another example, the hash corresponding to the private key 139 could be implemented as a tuple that includes one or more pieces of information, such as the biometric data associated with the user.

At block 318, the biometric key service 141 can derive a public key 133 from the private key 139. In particular, the public key 133 can be used to register the user with the identity verification program. Since the public key 133 can be derived from a private key 139 that can be based on the biometrics associated with the registering user, the public key 133 can be considered associated with the biometrics of the registering user. In various examples, public key 133 can be derived from the private key 139 using various approaches, such as, for example, a key derivation function.

At block 321, the biometric key service 141 can sign the transaction details. In particular, the biometric key service 141 signs the transaction details using the generated private key 139. By signing the transactions details using the private key 139, at least a portion of the verification of the user can be achieved by determining that the known public key 133 is associated with the private key 139 used to sign the transaction details.

At block 324, the biometric key service 141 can transmit the signed transaction details along with the public key 133 to the wallet application 127. The client device 103 can be communicatively coupled to the biometric security device 106 via a wired or wireless connection, and the signed transaction details and public key 133 are transmitted back to the client device 103 via the electronic communication channel formed via the wired or wireless connection.

At block 327, the wallet application 127 can generate the proof of membership. In particular, the wallet application 127 can cause the prover kit 136 to be executed using the public key 133 as an input. The proof of membership can be the output of the prover kit 136. In particular, the prover kit 136 can generate the proof of membership that can be used by the transaction terminal 115 to verify the identity of the user initiating the transaction. The proof of membership can be a zero-knowledge proof that is based on a zero-knowledge proof algorithm.

At block 330, the wallet application 127 can transmit the proof of membership, the public key 133, and the signed transaction details to the transaction terminal 115. In particular, the proof of membership, the public key 133 and the signed transaction details are transmitted over the network 121 in response to the verification request.

At block 333, the terminal application 143 can obtain the commitment data 146 associated with membership with the identification verification program. The commitment data 146 can be stored in the commitment repository 112, and as new members or registrations are added to the program, the commitment data 146 can be updated to account for the new members. As such, the terminal application 143 can poll the commitment repository 112 continuously, periodically, or randomly, to obtain the most recent commitment data 146 associated with the membership commitment.

At block 336, the terminal application 143 can verify membership of the user using the proof of membership, the public key 133, the commitment data 146, and the signed transaction data. In particular, the terminal application 143 can invoke the verifier kit 155 and submit the proof of membership, the public key 133, the signed transaction data and/or the commitment data 146 as inputs to the verifier kit 155. The output of the verifier kit 155 can indicate whether or not a membership is identified for the user. In various example, the verifier kit 155 can be used to verify that the associated membership is included in the commitment data 146 and verify that the signature of the transaction data is associated with the public key 133.

At block 339, the terminal application 143 can transmit an authorization request to the issuer system 118 requesting authorization of the transaction. According to various embodiments, the authorization request can include an indication that the identity of the user has been verified. In some examples, the authorization request can include the signed transaction details, the proof of membership and the public key 133 provided by the wallet application 127. In this example, the issuer service 158 can verify the identity of the user according to the functionality discussed in blocks 333 and 336. The verification by the issuer service 158 can be done in addition to and/or instead of the verification performed by the terminal application 143. In various examples, the authorization request can further include transaction details such as, for example, a transaction amount, a merchant name, a transaction account details, a summary of goods and/or services associated with the transaction, and/or other transaction details.

At block 342, the issuer service 158 can authorize the transaction. Using the transaction details included in the authorization request, the issuer service 158 can confirm that funds or credit is available for a given payment instrument 138, such that the payment transaction is authorized to proceed or not authorized to proceed. Further, the issuer service 158 can perform its own risk analysis to determine whether to authorize or deny the payment transaction. In various examples, authorization of the transaction can include verifying the identity of the user based at least in part on the indication in the authorization request, and/or by verifying the identity of the user using the proof of membership, public key 133, and signed transaction details. Upon authorization of the transaction, the issuer service 158 can generate a transaction confirmation identifier and send the transaction confirmation identifier to the terminal application 143.

At block 345, the terminal application 143 can finalize the transaction. In particular, once the terminal application 143 receives an indication from the issuer service 158 that the transaction has been approved, the terminal application 143 can send a notification to the wallet application 127 indicting approval of the transaction.

Figure 4:
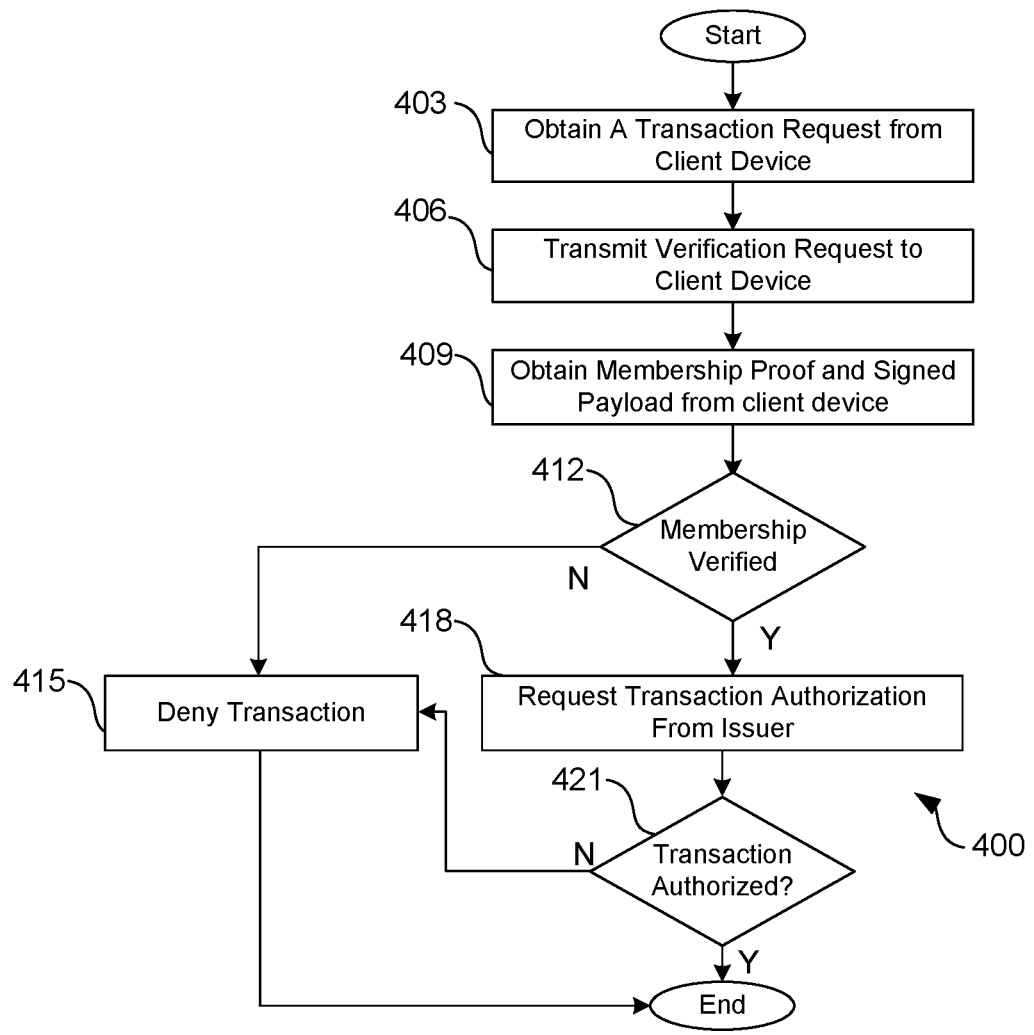
FIG. 4 is a flowchart illustrating an example of functionality implemented as a portion of the network environment of FIG. 2 according to various embodiments of the present disclosure. In particular.

Moving on to FIG. 4, shown is a flowchart 400 that provides one example of the operation of a portion of the terminal application 143. It is understood that the flowchart of FIG. 4 provides merely an example of the many different types of functional arrangements that can be employed to implement the operation of the depicted portion of the terminal application 143. As an alternative, the flowchart of FIG. 4 can be viewed as depicting an example of elements of a method implemented within the network environment 100.

Beginning with block 403, the terminal application 143 can obtain a transaction request from the client device 103. For example, a user can interact with the wallet application 127 to request a transaction with the transaction terminal 115 with respect to the purchase of goods or services using a payment instrument 138 that can be provided by an issuer associated with the issuer system 118. Accordingly, the wallet application 127 can generate a transaction request and transmit the transaction request to the terminal application 143 executing on the transaction terminal 115.

At block 406, the terminal application 143 can send a verification request to the wallet application 127. According to various embodiments, the verification request includes transaction details associated with the transaction. The transaction details can include a transaction amount, a list of goods or services associated with the transaction, merchant name, merchant address, and/or other type of transaction payload data. The verification request can be a request for a proof of membership and signed transaction details.

At block 409, the transaction application 143 can receive the signed transaction details and the proof of membership from the wallet application 127. In particular, the signed transaction details and the proof of membership are provided to the transaction application 143 from the wallet application 127 in response to the verification request.

At block 412, the transaction application 143 can determine if the identity of the user associated with the transaction request is verified. For example, the terminal application 143 can verify membership of the user using the proof of membership, the public key 133, obtained commitment data 146, and the signed transaction data. In particular, the terminal application 143 can invoke the verifier kit 155 provided by the trusted security provider and submit the proof of membership, the public key 133, the signed transaction data and/or the commitment data 146 as inputs to the verifier kit 155.

The output of the verifier kit 155 can indicate whether or not a membership is identified for the user according to a zero-knowledge proof algorithm. In various example, the verifier kit 155 can be used to verify whether the public key 133 is included in the commitment data 146 and verify that the signature of the transaction data is associated with the public key 133. If the output of the verifier kit 155 can indicate that a membership is not present in the commitment data 146, the process can proceed to block 415. Otherwise, the process can proceed to block 418.

At block 415, the terminal application 143 can deny the transaction and sends a notification to the client device 103 indicating that the transaction has been denied In particular, when the identity of the user cannot be verified, the terminal application 143 can deny the transaction to protect the merchant and issuer from a potential fraudulent transaction. In some situations, the transaction can be denied in response to a refusal to authorize the transaction by the issuer system 118. Thereafter, this portion of the process proceeds to completion.

At block 418, the terminal application 143 can transmit an authorization request to the issuer system 118 requesting authorization of the transaction. According to various embodiments, the authorization request can include an indication that the identity of the user has been verified. The authorization request can further include transaction details such as, for example, a transaction amount, a merchant name, a transaction account details, a summary of goods and/or services associated with the transaction, and/or other transaction details.

At block 421, the terminal application 143 can determine whether the issuer system 118 has authorized the transaction. In particular, the issuer service 158 can authorize the transaction by confirming that funds or credit is available for a given payment instrument 138, such that the payment transaction is authorized to proceed or not authorized to proceed. Further, the issuer service 158 can perform its own risk analysis to determine whether to authorize or deny the payment transaction. The issuer service 158 can notify the terminal application 143 whether the transaction is authorized or denied. If the transaction is denied, the terminal application 143 proceeds to block 415. Otherwise, this portion of the process proceeds to completion.

Figure 5:
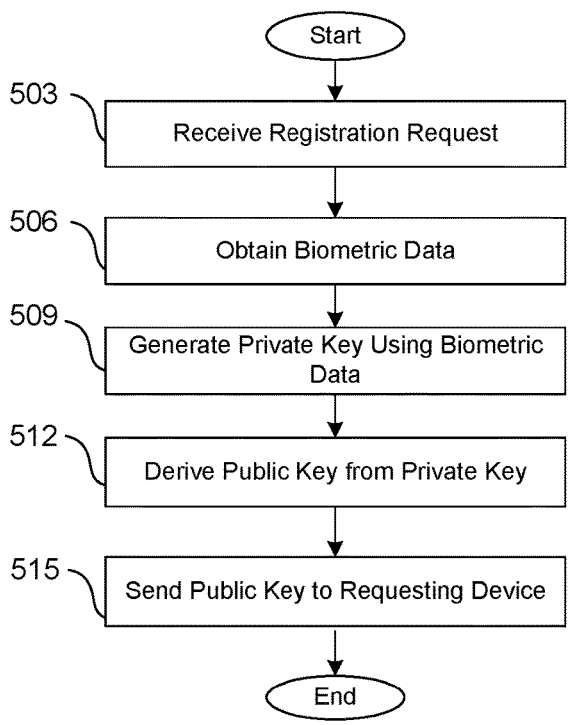
FIG. 5 is a flowchart illustrating an example of functionality implemented as a portion of the network environment of FIG. 2 according to various embodiments of the present disclosure. In particular.

Moving on to FIG. 5, shown is a flowchart 500 that provides one example of the operation of a portion of the biometric key service 141. It is understood that the flowchart 500 of FIG. 5 provides merely an example of the many different types of functional arrangements that can be employed to implement the operation of the depicted portion of the biometric key service 141. As an alternative, the flowchart 500 of FIG. 5 can be viewed as depicting an example of elements of a method implemented within the network environment 100.

At block 503, the biometric key service 141 can receive a registration request associated with the registration of a user with an identity verification program. In various examples, the registration request can be received from a client device 103, the trusted security provider system 109, issuer system 118, or other entity.

At block 506, the biometric key service 141 of the biometric security device 106 can obtain biometric data from a user requesting registration with an identity verification program. According to various embodiments, the biometric security device 106 can comprise an input sensor module (e.g., fingerprint scanner, voice recorder, iris scanner, retina scanner, camera, etc.) for obtaining biometric data associated with the user. A user can permit the biometric security device 106 to obtain the unique biometric data associated with the user via the input sensor module. Accordingly, the input sensor module collects the corresponding biometric data and transmits the collected data to the biometric key service 141.

At block 509, the biometric key service 141 can generate a private key 139. According to various embodiments, the private key 139 corresponds to a hash that is created using the collected biometric data. For example, the hash corresponding to the private key 139 could be computed using a cryptographic hash function that accepts the biometric data as an argument. In another example, the hash corresponding to the private key 139 could be implemented as a tuple that includes one or more pieces of information, such as the biometric data associated with the user.

At block 512, the biometric key service 141 can derive a public key 133 from the private key 139. In particular, the public key 133 can be used to register the user with the identity verification program. Since the public key 133 can be derived from a private key 139 that can be based on the biometrics associated with the registering user, the public key 133 can be considered associated with the biometrics of the registering user. In various examples, public key 133 can be derived from the private key 139 using various approaches, such as, for example, a key derivation function.

At block 515, the biometric key service 141 can transmit the public key 133 to the requesting device. For example, the biometric security device 106 can be communicatively coupled to another device (e.g., the trusted security provider system 109, the client device 103, the issuer system 118, etc.) via a wired or wireless connection. As such, the public key 133 can be transmitted to requesting device through the established electronic communication channel formed through the wired or wireless connection. In some examples, the biometric key service 141 can further transmit additional information (e.g., device identifier, device manufacture, etc.) associated with the biometric security device 106 to the security provider service 149. The public key 133 can then be used to update a commitment to include the registration associated with the user. Thereafter, this portion of the process proceeds to completion.

Figure 6:
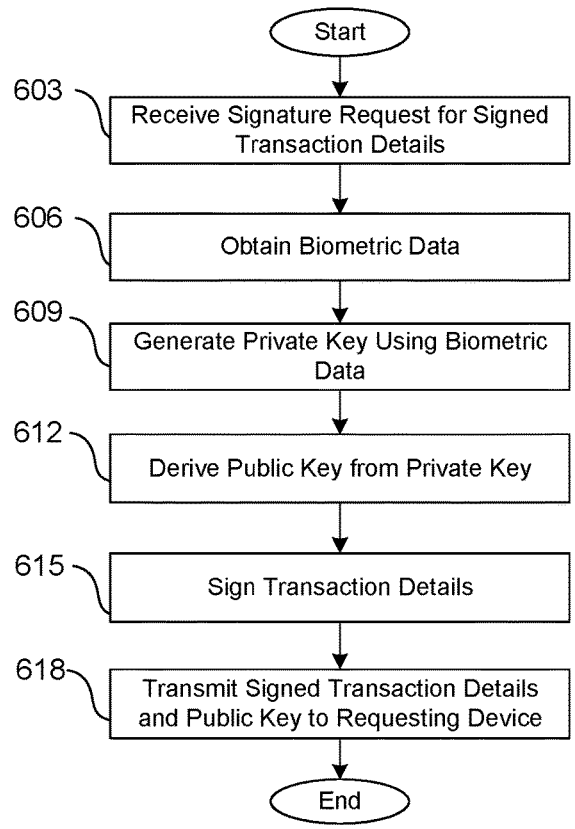
FIG. 6 is a flowchart illustrating an example of functionality implemented as a portion of the network environment of FIG. 2 according to various embodiments of the present disclosure. In particular.

Moving on to FIG. 6, shown is a flowchart 600 that provides one example of the operation of a portion of the biometric key service 141. It is understood that the flowchart 600 of FIG. 6 provides merely an example of the many different types of functional arrangements that can be employed to implement the operation of the depicted portion of the biometric key service 141. As an alternative, the flowchart 600 of FIG. 6 can be viewed as depicting an example of elements of a method implemented within the network environment 100.

Beginning with block 603, the biometric the biometric key service 141 can receive a signature request. The signature request can be received in response to the initiation of a transaction by the client device 103. In particular, the signature request can include transaction details associated with the transaction that need to be signed using a private key 139 that is generated using biometric data obtained form a user. In various examples, the signature request can be received from a client device 103, a transaction terminal 115, an issuer system 118, or other entity.

At block 606, the biometric key service 141 of the biometric security device 106 can obtain biometric data from a user requesting registration with an identity verification program. According to various embodiments, the biometric security device 106 can comprise an input sensor module (e.g., fingerprint scanner, voice recorder, iris scanner, retina scanner, camera, etc.) for obtaining biometric data associated with the user. A user can permit the biometric security device 106 to obtain the unique biometric data associated with the user via the input sensor module. Accordingly, the input sensor module collects the corresponding biometric data and transmits the collected data to the biometric key service 141.

At block 609, the biometric key service 141 can generate a private key 139. According to various embodiments, the private key 139 corresponds to a hash that is created using the collected biometric data. For example, the hash corresponding to the private key 139 could be computed using a cryptographic hash function that accepts the biometric data as an argument. In another example, the hash corresponding to the private key 139 could be implemented as a tuple that includes one or more pieces of information, such as the biometric data associated with the user.

At block 612, the biometric key service 141 can derive a public key 133 from the private key 139. In particular, the public key 133 can be used to register the user with the identity verification program. Since the public key 133 can be derived from a private key 139 that is based on the biometrics associated with the registering user, the public key 133 can be considered associated with the biometrics of the registering user. In various examples, public key 133 can be derived from the private key 139 using various approaches, such as, for example, a key derivation function.

At block 615, the biometric key service 141 can sign the transaction details. In particular, the biometric key service 141 signs the transaction details using the generated private key 139. By signing the transactions details using the private key 139, at least a portion of the verification of the user can be achieved by determining that the known public key 133 is associated with the private key 139 used to sign the transaction details.

At block 618, the biometric key service 141 can transmit the public key 133 and signed transaction details to the requesting device. For example, the biometric security device 106 can be communicatively coupled to another device (e.g., the client device 103, the transaction terminal 115, the issuer system 118, etc.) via a wired or wireless connection. As such, the public key 133 and the signed transaction details can be transmitted to requesting device through the established electronic communication channel formed through the wired or wireless connection. Thereafter, this portion of the process proceeds to completion.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages could be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X and/or Y; X and/or Z; Y and/or Z; X, Y, and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a client device comprising a processor and a memory; and
   machine-readable instructions stored in the memory that, when executed by the processor, cause the client device to at least:
   initiate a transaction with a transaction terminal;
   receive a verification request from the transaction terminal, the verification request comprising transaction details associated with the transaction initiated with the transaction terminal, and the verification request being used to verify a user associated with the transaction and the client device;
   send a signature request to a biometric security device requesting that the transaction details be signed with a private key, the private key corresponding to biometric data of the user associated with the transaction, and the private key being generated by the biometric security device;

receive signed transaction details and a public key from the biometric security device, the public key being derived from the private key corresponding to the biometric data;

generate a proof of membership in response to executing a prover kit of a zero-knowledge proof algorithm and applying the public key as an input to the prover kit, the proof of membership comprising a zero-knowledge proof configured to verify an identity of the user associated with the transaction; and transmit the proof of membership, the signed transaction details, and the public key to the transaction terminal as a response to the verification request.

2. The system of claim 1, wherein the machine-readable instructions further cause the client device to at least receive the prover kit from a security provider.

3. The system of claim 1, wherein the processor and the memory comprise a first processor and a first memory, and the system further comprises the biometric security device having a second processor and a second memory.

4. The system of claim 3, wherein the biometric security device comprises a biometric input reader for obtaining biometric data associated with a user.

5. The system of claim 4, wherein the biometric data comprises at least one of a fingerprint, a handprint, a retinal scan, a facial scan, or a voice sample.

6. The system of claim 4, wherein the biometric security device further comprises machine-readable instructions stored in the second memory that, when executed by the second processor, cause the biometric security device to at least:

obtain the biometric data from a biometric input reader;
generate a hash based on the biometric data, the hash corresponding to the private key; and
generate the public key based on the private key.

7. The system of claim 3, wherein the biometric security device is integrated within the client device.

8. The system of claim 3, wherein the biometric security device is communicatively coupled to the client device via a wired or wireless connection.

9. A method, comprising:

receiving a request to register a user with a verification program;
obtaining a public key from a biometric security device associated with the user, the public key being derived from a private key that is a hash generated from biometric data of the user that is obtained via the biometric security device;
verifying an identity of the user associated with the biometric security device;
generating a registration entry based on the public key in response to verifying the identity of the user, the registration entry corresponding to a cryptographic accumulator commitment generated using the public key; and
publishing the registration entry via a repository.

10. The method of claim 9, further comprising:

generating a verifier kit corresponding to a zero-knowledge proof algorithm, the verifier kit being an application that verifies a proof of membership according to the zero-knowledge proof algorithm; and
providing the verifier kit to a transaction terminal.

11. The method of claim 10, further comprising:

generating a prover kit corresponding to the zero-knowledge proof algorithm, the prover kit being an application by which the proof of membership can be generated according to the zero-knowledge proof algorithm; and
providing the prover kit to a client device associated with the user.

12. The method of claim 9, wherein the repository comprises a distributed ledger.

13. The method of claim 9, wherein verifying the identity of the user associated with the biometric security device further comprises verifying a trusted form of identification associated with the user.

14. The method of claim 13, wherein the trusted form of identification comprises a passport, a state-issued identification card, a driver's license, or a military-issued identification card.

15. A non-transitory computer-readable medium embodying a program executable in at least one computing device, wherein the program, when executed, causes the at least one computing device to at least:

obtain a transaction request from a client device, the transaction request being associated with a user linked to an account with an issuer system;
send a verification request for verification data to the client device, the verification data being used to verify the user associated with the transaction request, and the verification request comprising transaction details of the transaction request;
obtain the verification data from the client device, the verification data comprising a proof of membership, a public key, and the transaction details signed with a private key associated with the public key, the private key corresponding to biometric data of the user associated with the transaction request, and the public key being derived from the private key;
invoke a verifier kit associated with a zero-knowledge proof algorithm, inputs of the verifier kit comprising the verification data and commitment data stored in a repository;
verify the user based at least in part on an output of the verifier kit; and
send an authorization request to the issuer system associated with the transaction request, the authorization request indicating that the user has been verified.

16. The non-transitory computer-readable medium of claim 15, wherein the repository comprises a distributed ledger.

17. The non-transitory computer-readable medium of claim 15, wherein, when executed, the program further causes the at least one computing device to at least receive the verifier kit from a security provider system, the verifier kit comprising an application that verifies the proof of membership according to the zero-knowledge proof algorithm.

18. The non-transitory computer-readable medium of claim 17, wherein the proof of membership comprises a result of a prover kit according to the zero-knowledge proof algorithm, the prover kit being executed by the client device and being associated with the security provider system.

19. The non-transitory computer-readable medium of claim 17, wherein, when executed, the program further causes the at least one computing device to at least:

receive authorization from the issuer system; and
send a notification to the client device indicating that the transaction request is authorized.

20. The method of claim 9, wherein the cryptographic accumulator commitment is further generated based at least in part on a device identifier associated with the biometric security device.

* * * * *